Nov. 9, 1937.   E. W. McKNIGHT   2,098,922
APPARATUS FOR MAKING CABLE
Filed Jan. 8, 1934   6 Sheets-Sheet 1
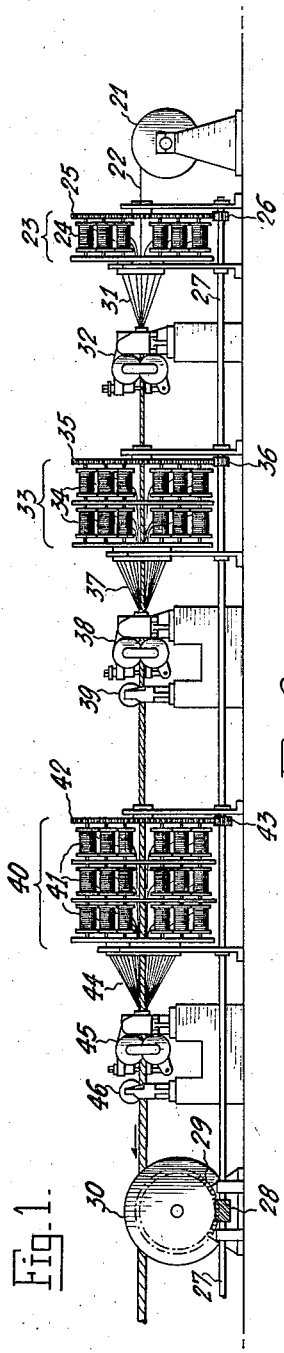
INVENTOR
Edgar W. McKnight.
BY
ATTORNEYS.

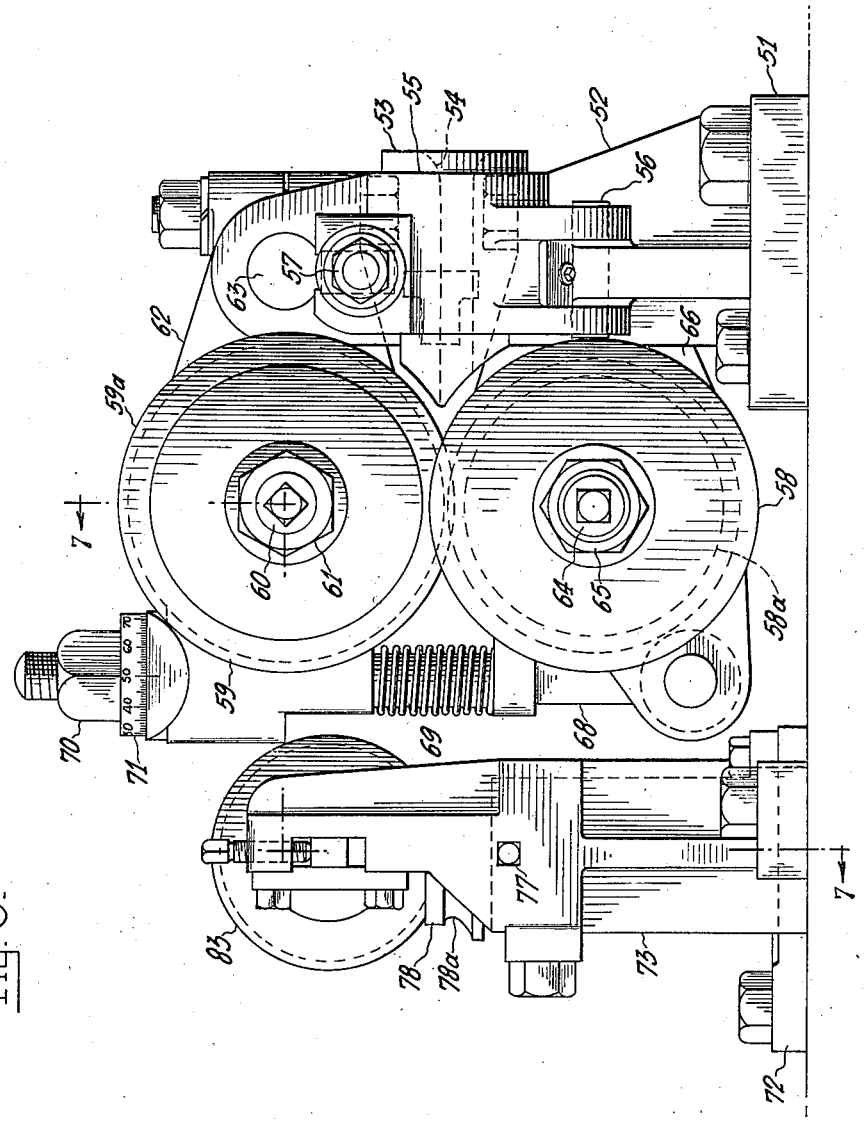

Nov. 9, 1937.  E. W. McKNIGHT  2,098,922
APPARATUS FOR MAKING CABLE
Filed Jan. 8, 1934  6 Sheets-Sheet 3

INVENTOR
Edgar W. McKnight.
BY
ATTORNEYS.

Nov. 9, 1937.　　　　E. W. McKNIGHT　　　2,098,922
APPARATUS FOR MAKING CABLE
Filed Jan. 8, 1934　　　6 Sheets-Sheet 5

INVENTOR
*Edgar W. McKnight*
BY
Emery, Booth, Varney & Whittemore
ATTORNEYS.

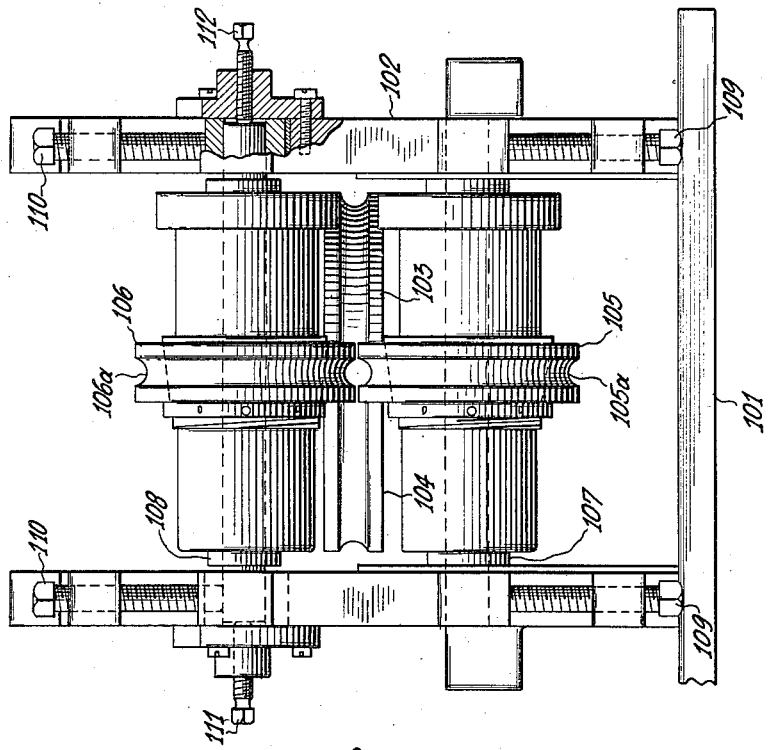
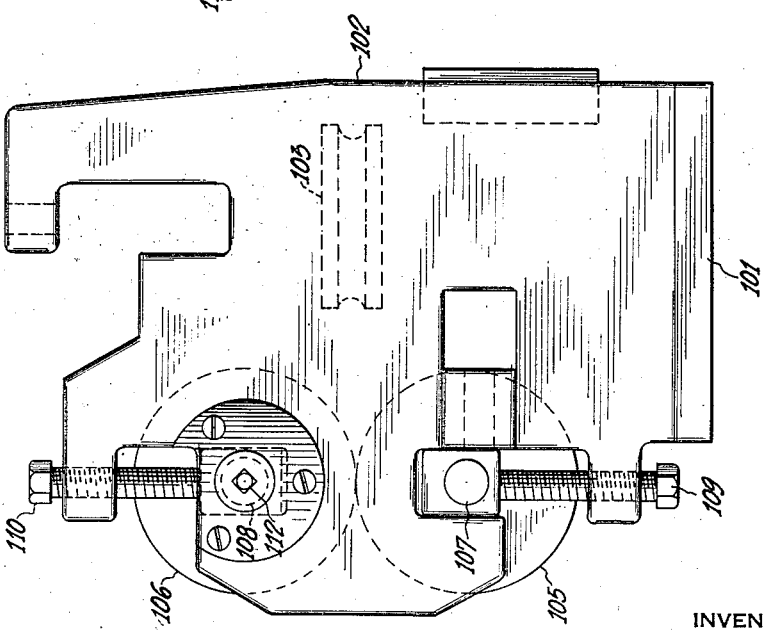

Patented Nov. 9, 1937

2,098,922

UNITED STATES PATENT OFFICE 2,098,922

APPARATUS FOR MAKING CABLE

Edgar W. McKnight, Bayonne, N. J., assignor to General Cable Corporation, New York, N. Y., a corporation of New Jersey Application January 8, 1934, Serial No. 705,793

15 Claims. (Cl. 117—20)

This invention relates to apparatus for the manufacture of stranded electrical conductors, commonly called cables. More particularly the invention is concerned with apparatus for the manufacture of cables in which the individual strands, initially having shapes such that deep valleys exist therebetween when assembled in the cable, and usually initially round, are compressed and compacted together to produce a cable of the desired shape and cross section having a relatively high volume efficiency, improved ability to bend with a minimum of distortion, and a smoothly formed outer surface free from deep valleys. It is an object of the invention to provide improved apparatus for producing cables of the type described by commercially practicable methods. Other objects and advantages of the invention will appear hereinafter.

This invention is a result of research and development work in connection with the manufacture of stranded conductors for the transmission of electrical energy, and this application is a continuation in part of my co-pending application for Electrical cable and method of manufacture, Serial No. 620,607 filed July 2, 1932, patented January 9, 1934, No. 1,943,086. While the invention perhaps has its greatest importance in the field of electrical cables, it will be apparent from the description that it may also have important applications in other fields. The scope of the present invention will be more particularly pointed out in the appended claims.

Stranded cables used in the transmission of electrical energy commonly comprise a plurality of initially round wires, for example copper, arranged in overlying helical layers about a longitudinally extending central core, for example a wire or a plurality of wires. Heretofore it has been necessary to have the wires in adjacent layers extend in opposite helical directions to prevent some of the wires of one layer dropping below the level of adjacent wires in the same layer into the valleys between the wires of the underlying layer.

In insulated and sheathed single conductor cables the conductors usually are round, whereas in multiple conductor cables the conductors usually are formed to sector shape to reduce the size of the spaces between the insulated conductors and thereby reduce the over-all diameter of the sheathed cable.

As a result of my consideration of this subject leading up to the present invention I have found that the surface of the cable, whether round or sector shape, should be smoothly formed and free from deep valleys and projecting ridges. Furthermore, it is desirable to reduce, insofar as is possible, the non-conducting areas between wires in the conductor cross section, in other words, to increase the volume efficiency to a figure approaching 100%. By "volume efficiency" is meant the ratio of the total actual cross section of metal to the area of the plane figure formed by a smooth curved line circumscribing the cable cross section.

The ideal sector conductor is one of such shape that when insulated it fits with the other insulated conductors to form a round insulated cable in which all of the conductor insulation is of uniform thickness and uniformly compressed. Except as hereinafter noted, this ideal sector conductor has a cross section which is a modified circular sector whose periphery consists of an arc concentric to the periphery of the cable inside of the binding tape or belt insulation, and the two radii of the sector diverging from a point on the cable radius, at an angle of 120 degrees for a three conductor cable, or at an angle of 90 degrees for a four conductor cable.

In order to avoid a dangerous concentration of surface stresses at the sharp angles on the edges and vertex of the sector conductor, it is necessary to make these edges and the vertex round with circular arcs whose radii have lengths in proportion to the voltage for which the cable is designed. This rounding of the edges and vertex also enables the application of insulating tapes to the conductor smoothly and under uniform tension.

The ideal sector conductor will be so constructed that it will have a minimum "V-gauge" depth, and still be flexible so that it may readily be bent in any direction without disturbing the outer surface of the conductor. The "V-gauge" depth is the distance from the intersection of the radii of the sector conductor to a point on the arc of the sector midway between the edges. It will be apparent that the outside diameter of the finished cable is dependent on the V-gauge depth of the conductors.

While it is desirable to make the V-gauge depth as small as possible, the cross sectional conducting area of the conductor is fixed by the cable specifications, and the V-gauge depth therefore can be reduced only by elimination, insofar as is possible, of non-conducting areas between strands in the conductor cross section. In other words, the volume efficiency of the conductor should be a maximum.

To approach the ideal cable it will be necessary to compact the strands and give a definite predetermined shape and smoothly formed outer surface to the assembled strands in the manner hereinafter described. This invention provides apparatus for producing in an economical and commercially practicable manner improved conductors which more nearly approach the ideal than any stranded conductors heretofore available.

If cables having the strands in adjacent layers laid in opposite helical directions are crushed or rolled the strands are badly deformed where they cross each other. This deformation of the strands reduces the tensile strength of the cable and increases its electrical resistance. Even more serious is the interlocking or mortising together of the strand layers by reasons of the strand deformation. This interlocking of the layers materially reduces the flexibility of the cable and prevents the making of short bends in the cable without the formation of baskets, that is, the bulging or spreading apart of the strands. This problem is of great importance in electrical cables where the cables must be bent during manufacture and installation, and where any displacement or radial movement of the outer strands might seriously damage the overlying conductor insulation.

According to the present invention apparatus is provided for rolling each layer of strands in the cable before the next layer is applied so as to reduce the spaces between strands and to provide a substantially smooth even surface free from deep valleys as a foundation for the succeeding layer. Each layer of strands is rolled accurately to the desired shape with the elimination around its entire periphery of deep valleys and projecting ridges, and without excessive hardening of the metal. The strands in all of the layers may then be laid in the same general helical direction without the disadvantages enumerated above, and such cable will have a high degree of flexibility because the smooth substantially parallel strands can slide easily on each other. In electrical cables there is a further advantage in that the alternating current resistance is reduced if the strands extend in substantially parallel courses.

The invention will be best understood from the following description when read in the light of the accompanying drawings of certain specific embodiments of the invention.

In the drawings:

Fig. 1 is a somewhat diagrammatic showing of apparatus for manufacturing a compact sector cable;

Fig. 2 is a side elevation of a short length of thirty-seven strand sector-shaped cable, the several layers of wires being progressively cut away to disclose the construction more clearly;

Fig. 3 is a section to enlarged scale through the cable of Fig. 2, substantially on the line 3—3;

Fig. 4 shows in superimposed relation the cable passes or openings through the several cable rolling units of Fig. 1, for making the cable of Figs. 2 and 3;

Fig. 5 is a side elevation to enlarged scale of two of the cable rolling units shown in Fig. 1;

Figure 8:
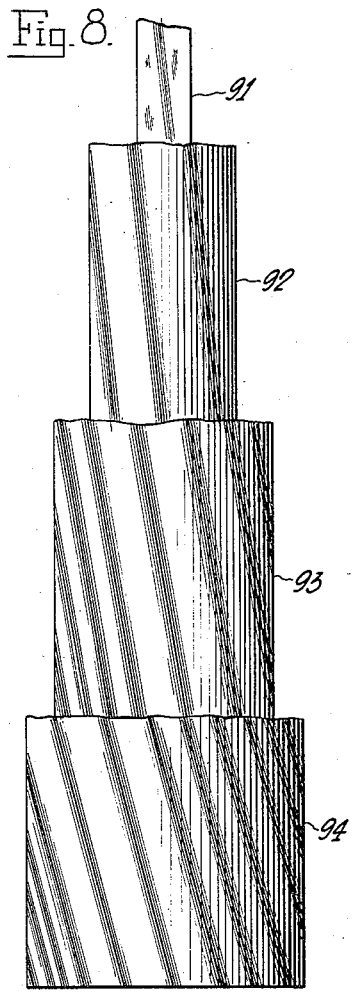
Fig. 8 is a side elevation of a short length of thirty-seven strand round cable, the several layers of wires being progressively cut away to disclose the construction more clearly.
Figure 9:
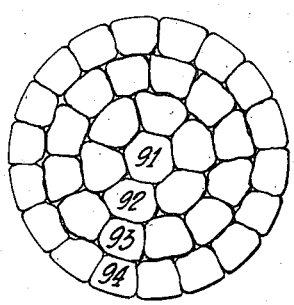
Fig. 9 is an end elevation of the cable of Fig. 8.

Figs. 10 to 16, inclusive, are sections through the several sets of cable rolls, which would be used for making the cable of Figs. 8 and 9, these sections being perpendicular to the line of movement of the cable through the stranding machine;

Fig. 17 is a side elevation of the final cable rolling unit particularly suitable for manufacturing round cables; and Fig. 18 is an end elevation of the rolling unit shown in Fig. 17.

Referring first to Fig. 1, there is shown, more or less diagrammatically, apparatus for the manufacture in accordance with this invention of a thirty-seven strand sector-shaped cable having a high volume efficiency, an ideal shape and a substantially smooth outer surface free from deep valleys. At the right hand end of the figure is a reel 21 containing a supply of wire 22 which serves as the center core for the cable. The wire 22 passes from the supply reel 21 to the left through the flyer 23 which wraps the layer of wires 31 helically around the core 22. The flyer 23 conveniently comprises spaced parallel disks which are suitably connected and mounted to rotate together, and between which are mounted a plurality of wire supply reels 24. In this illustrative embodiment, where all of the cable wires are the same size, there are six of the wire supply reels 24.

In operation the flyer 23 is rotated as by means of a gear 25 on the outer periphery of one of the disks which meshes with a gear 26 rigidly secured on a main drive shaft 27 extending the full length of the apparatus. The shaft 27 may be driven by means of any suitable source of power, (not shown). Conveniently this shaft is connected, for example through the worm 28 on the shaft 27 and the worm gear 29 rigidly secured on the capstan 30, to drive a capstan 30 which draws the cable through the apparatus.

As the flyer 23 rotates about the longitudinally moving wire 22, the wires 31 are drawn from the supply reels 24 and wrapped helically about the core 22. From the flyer 23 the core, which now comprises seven strands, passes through a rolling unit 32 which will be described in greater detail hereinafter. In passing through the rolling unit 32 the seven strand core is rolled in a vertical plane to materially alter the shape of the individual strands and compress them together so as to reduce the spaces between wires and give to the core the enclosing contour substantially as shown at 47 in Fig. 4.

From the rolling unit 32 the seven strand core passes through the flyer 33. The flyer 33 conveniently comprises three parallel spaced disks which are connected and mounted to rotate together. Between the spaced disks are mounted a plurality of wire supply reels 34. In the illustrative embodiment there are twelve of the wire supply reels 34. The flyer 33 is rotated, for example, by means of a gear 35 on the outer periphery of one of the disks which meshes with a gear 36 rigidly secured on the drive shaft 27. As the seven strand core passes through the flyer 33 a layer of wires 37 from the supply reels 34 will be stranded helically about the core in the same direction as the wires 31.

From the flyer 33 the core, now comprising nineteen strands, passes to a rolling unit 38 which, except for the size and shape of the opening between the rolls, may be generally similar in construction to the rolling unit 32. The unit 38 rolls the core along the minor axis of a transverse section, and the pass through the rolls of the unit desirably has a shape substantially as shown at 48 in Fig. 4.

From the rolling unit 38 the core passes directly to a rolling unit 39 which differs in construction from the units 32 and 38, and which will be described in greater detail hereinafter. The unit 39 rolls the core along the major axis of a transverse section, while at the same time limiting expansion along the minor axis. This rolling unit forces the strand material inwardly from the edges of the core, thereby reducing the spaces between the strands and imparting to the core around its entire periphery a substantially smooth surface free from deep valleys and projecting ridges. The pass through the rolling unit 39 desirably has a shape substantially as shown at 48a in Fig. 4.

From the rolling unit 39 the nineteen strand core passes through the flyer 40 conveniently comprising four parallel spaced disks which are connected and mounted to rotate together. Between the spaced disks are mounted a plurality of wire supply reels 41. Conveniently the flyer 40 is rotated by means of a gear 42 on the outer periphery of one of the disks which meshes with a gear 43 rigidly secured on the drive shaft 27. In the illustrative embodiment there are eighteen of the wire supply reels 41, and as the flyer 40 rotates there will be helically wrapped about the nineteen strand core over the layer 37 a layer of eighteen wires 44. The wires 44 desirably are stranded in the same general helical direction as the wires 31 and 37.

From the flyer 40 the thirty-seven strand core passes to a rolling unit 45 which, except for the size and shape of the opening between the rolls, may be generally similar in construction to the units 32 and 38. The unit 45 rolls the cable along the minor axis of a transverse section, and desirably the pass through this rolling unit has a contour substantially as shown at 49 in Fig. 4. From the rolling unit 45 the cable passes to the rolling unit 46 which may be generally similar in construction to the unit 39, although the size of the opening between the rolls is larger. The unit 46 rolls the cable along the major axis of a transverse section and gives to the cable the desired cross section, and around its entire periphery a smooth outer surface free from deep valleys and projecting ridges. The pass through the rolling unit 46 desirably has a contour substantially as shown at 49a in Fig. 4.

Figure 6:
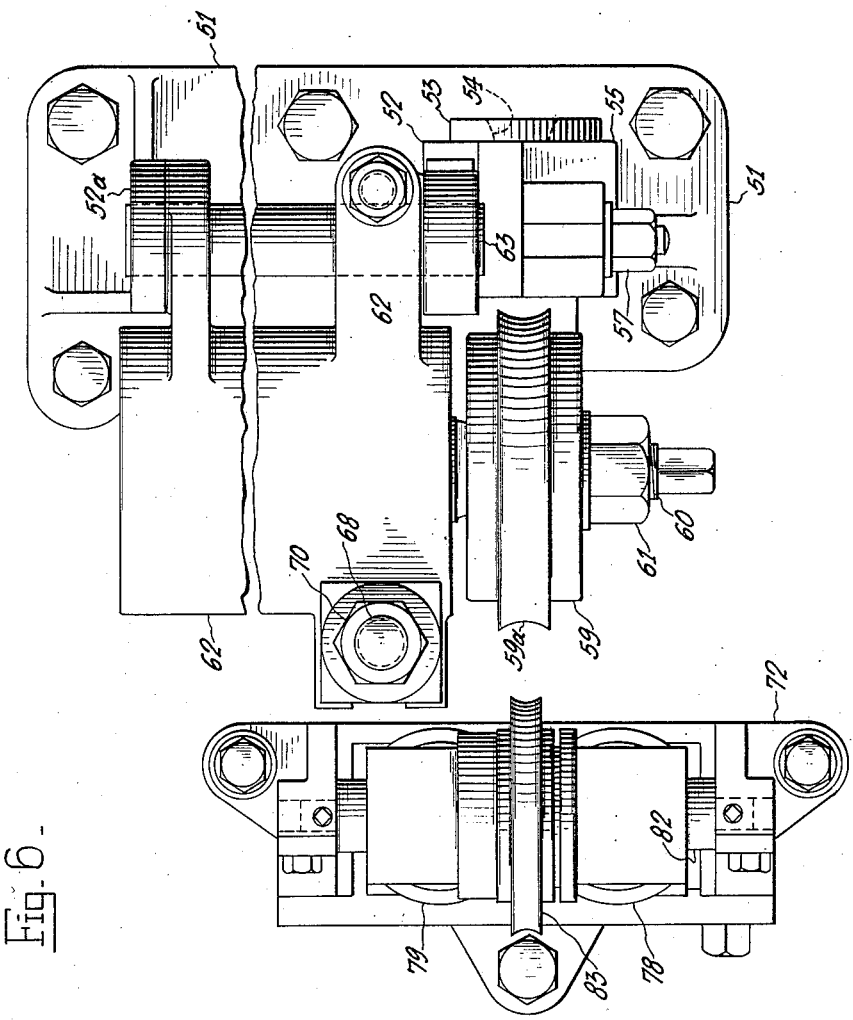
Fig. 6 is a top plan view of the apparatus shown in Fig. 5.
Figure 7:
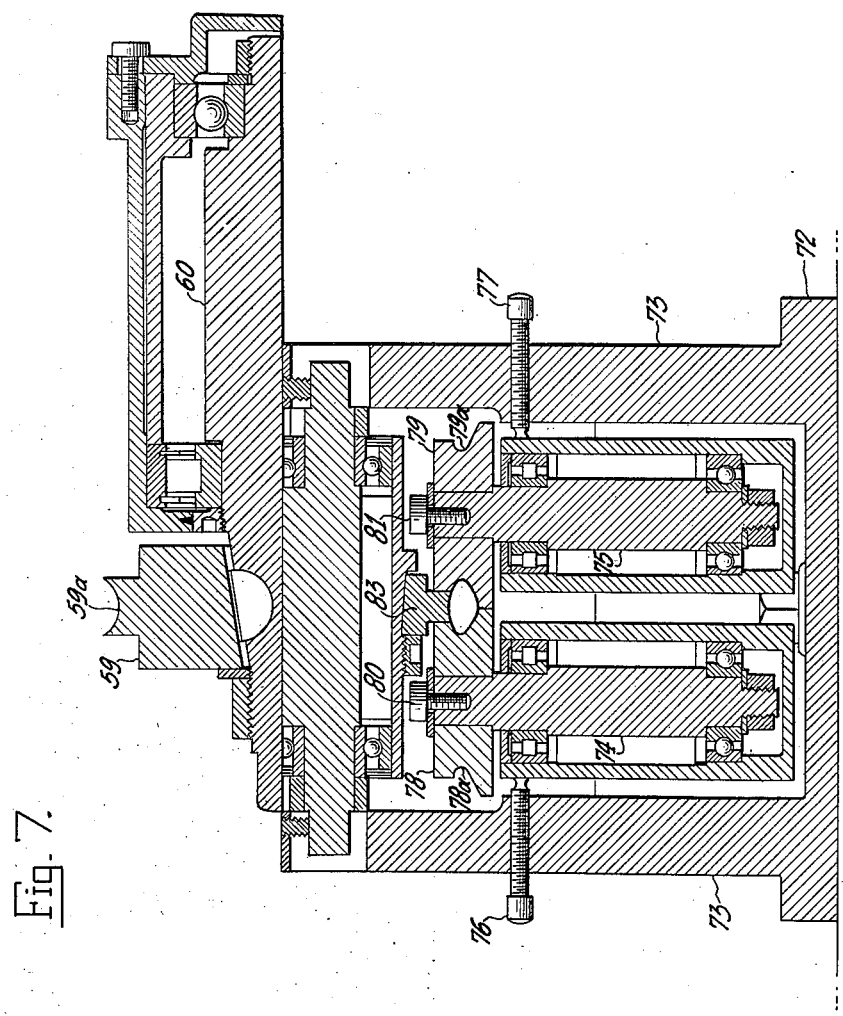
Fig. 7 is a section substantially on the line 7—7 of Fig. 5.

The construction of the cable rolling units shown in Fig. 1 is disclosed in greater detail in Figs. 5, 6 and 7. The units 32, 38 and 45 are illustrated in the right hand portion of Figs. 5 and 6, and the units 39 and 46 appear at the left in these figures.

The units 32, 38 and 45 differ from each other only in the cable guides and the rolls which define the passes through these units. The units roll the cable in one plane, namely along the minor axis of the transverse section. Referring particularly to Figs. 5 and 6, the base 51 has an upwardly projecting standard 52 in which is removably mounted a guide 53 having a throat 54 for directing the cable to the rolls. In this particular embodiment the guide 53 is held in place by means of a plate 55 hinged to the standard 52 at 56 and normally secured in closed position by means of a nut and screw 57. The guide 53 is easily removable and may be interchanged with other guides to permit the use of the rolling unit for different sized cables.

From the guide 53 the cable, which is not shown in these figures, passes to the left between the rolls 58 and 59. The upper roll 59 is secured on one end of a shaft 60, as by means of a nut 61. The shaft 60 is rotatably mounted in a housing 62 which has a limited turning movement about a shaft 63 mounted in the upper ends of the standards 52 and 52a. It will be apparent that the roll 59 may be easily removed and replaced by other rolls for rolling different sized or shaped cables.

The lower roll 58 is mounted directly below the roll 59 on one end of a shaft 64. The roll 58 is held in place as by means of a nut 65. The shaft 64 is rotatably mounted in a housing 66 which is secured to the standard 52 below and in a manner generally similar to the housing 62.

Pivotally secured on the outer end of the housing 66 is an upwardly extending rod 68 which passes through a vertically extending opening in the outer end of the housing 62. Desirably means such as a spiral spring 69 surrounding the rod 68 normally tends to force the housings and rolls apart. The upper end of the rod 68 desirably is screwthreaded and is provided with a nut 70 for drawing the rolls together against the force of the spring 69. Desirably the nut 70 is provided with a micrometer scale at 71 whereby accurate and uniform adjustment of the rolls may be secured.

The lower roll 58 is provided on its edge with an annular groove 58a, the bottom of which is designed in accordance with the shape to be given to the lower half of the cable in passing between the rolls 58 and 59. The upper roll 59, as is clearly shown in Figs. 6 and 7, is provided with a raised rim 59a which exactly fits into the groove in the lower roll 58 and which gives to the upper portion of the cable the desired shape as the cable passes between the rolls.

It will be apparent that in the construction described the rolls may be easily adjusted and readily interchanged. The construction permits extremely accurate rolling of the cable, and compresses the cable in the plane of the minor axis of the transverse section.

The units 39 and 46 differ from each other only in the rolls which define the passes through these units. These units roll the cable along the major axis of a transverse section, and at the same time limit expansion of the cable along the minor axis by reason of simultaneous rolling along the minor axis.

Referring to Figs. 5, 6 and 7, the base 72 has an upwardly projecting housing 73 in which are rotatably mounted the vertical shafts 74 and 75. These shafts 74 and 75 have no freedom of movement in the direction of movement of the cable through the unit, but are adjustable toward and away from each other as by means of the screws 76 and 77.

Secured on the upper end of the shafts 74 and 75 are the edging rolls 78 and 79. Desirably these rolls are removably secured on the shafts as by means of screws 80 and 81 so that they may be interchanged for different sized cables.

The rolls 78 and 79 are identical, and are provided on their edges with annular grooves 78a and 79a which are accurately machined to compress the cable along the major axis of a transverse section and to accurately shape the edges of the cable. Preferably the lower edges of the rolls contact with each other, and the upper edges of the rolls are spaced apart. It will be seen that these rolls force the material in the edges of the cable inwardly, reducing the spaces between the strands and giving an accurate shape and a uniformly smooth surface free from deep valleys to the edges of the cable.

Mounted in the upper end of the housing 73 is a vertically adjustable horizontal shaft 82 carrying a roll 83. The roll 83, as is clearly shown in Figs. 6 and 7, is provided on its periphery with a raised rolling surface which enters between the upper edges of the rolls 78 and 79 and is designed to complete the pass for the cable. Thus it will be seen that while the units 39 and 46 roll the cable along the major axis of the transverse section, the shape and surface of the entire cross section is accurately controlled during this rolling operation.

In Fig. 2 is shown a short length of thirty-seven strand sector-shaped cable made by the apparatus of this invention, and in Fig. 3 is shown to enlarged scale a cross section through the cable. It will be seen that the outer surface of the cable is smoothly formed and free from deep valleys and projecting ridges around its entire periphery. Although all of the strands are spiralled in the same general helical direction and the volume efficiency approaches 100% there is no mortising together of the cable layers, and the cable is readily flexible and may be bent on a small radius without the formation of baskets.

Figs. 8 and 9 show to enlarged scale a thirty-seven strand round cable such as may be made with the apparatus of this invention. In making this cable apparatus may be used substantially as shown in Fig. 1, with the changes hereinafter described for the rolling units.

Figure 10:
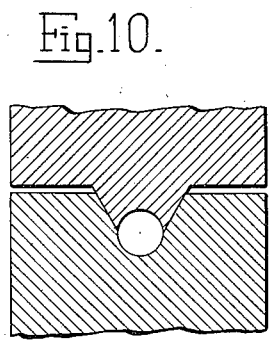

The wire 91 serves as the core of the cable shown in Figs. 8 and 9, and in moving through the flyer 23, (Fig. 1) there will be placed about this wire a layer of wires 92. Ordinarily all of these wires will be initially round. This seven wire core is moved through the rolling unit 32, the rolls being shaped to have a pass substantially as shown in Fig. 10. These rolls compact the wires, reducing the over-all dimension, and desirably compress the cable slightly out-of-round.

As the seven wire core comes from the rolling unit 32, it desirably passes through another rolling unit, (not shown in Fig. 1) which is generally similar to the rolling units 39 and 46 except for the size and shape of the rolls. The rolls in this unit desirably are two in number and compress the cable in a plane substantially at 90 degrees to the plane of the first rolling, and desirably this compression is slightly beyond the round shape. The opening through these rolls is shown in Fig. 11.

Figure 11:
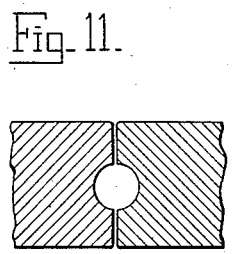
Figure 12:
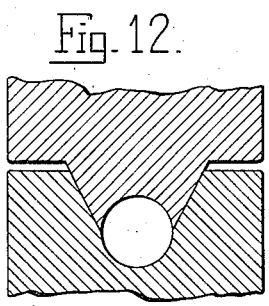
Figure 13:
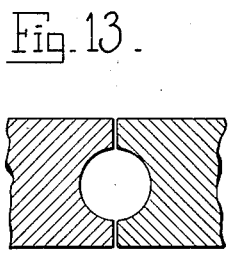

As the seven wire core emerges from the rolls shown in Fig. 11 the strands will spring back very slightly from the out-of-round shape to substantially round shape. This round core passes through the stranding unit 33, (Fig. 1) wherein a layer of wires 93 are laid helically about the core. As the core emerges from the stranding unit 33 it passes through the rolling unit 38, in which the rolls desirably are shaped to have a pass substantially as shown in Fig. 12. These rolls, operating in a vertical plane, compress the cable slightly out-of-round and materially reduce the spaces between wires in this layer. The nineteen wire core then passes through the rolling unit 39, desirably having two horizontal rolls with an opening as shown in Fig. 13. The rolls of the unit 39 compress the cable slightly out-of-round, so that when the cable emerges from this set of rolls the strands will spring back slightly to a substantially round shape.

Figure 14:
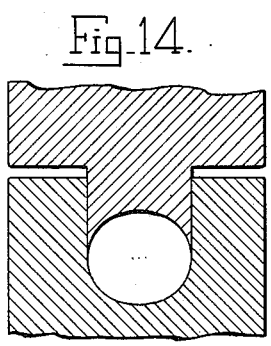

The nineteen wire core then passes to the stranding unit 40, where a layer of eighteen wires 94 is applied. The cable, now comprising thirty-seven wires, passes through the rolling unit 45 where it is compressed to materially reduce the spaces between wires in the outermost layer. The shape of the rolls in this unit desirably are substantially as shown in Fig. 14. It will be noted that these rolls differ from the vertical rolls in the other units by having the edges of the groove in the lower roll vertical rather than inclined. Furthermore, the pass formed by these rolls desirably is shaped to compress the cable somewhat more out-of-round than in the case of the preceding units.

Figure 15:
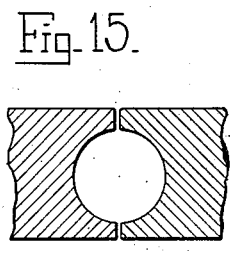
Figure 16:
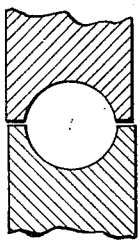

From the rolling unit 45 the cable desirably passes through the rolling unit shown in Figs. 17 and 18 and then to the capstan 30. This last mentioned rolling unit desirably rolls the cable first in a horizontal plane to compress the cable very slightly-out-of-round, and with a further slight reduction in the spaces between wires. Then the cable is rolled again in a vertical plane with only sufficient compression to give to the finished construction the desired round shape. The shapes of these rolls are shown in Figs. 15 and 16, and desirably the last pair of rolls has its grooves slightly offset from each other, as shown in the drawings.

Referring to Figs. 17 and 18, there is shown the rolling unit which may be substituted for the unit 46 in Fig. 1 in manufacturing round cables. Projecting upwardly from a base 101 is a housing 102 which contains a pair of horizontal rolls 103 and 104, which roll the cable in a horizontal plane. Conveniently the rolls 103 and 104 may be mounted in the housing 102 in the same manner in which the horizontal rolls are mounted in the units 39 and 46. In Figs. 17 and 18 the rolls 103 and 104 are indicated but the actual mounting has been omitted for simplicity.

Also within the housing 102 is a set of rolls 105 and 106 which desirably roll the cable in a vertical plane. Conveniently these rolls are secured on shafts 107 and 108 which are mounted in the wall of the housing 102, and are adjustable toward and away from each other as by means of the screws 109 and 110. The roll 105 has on its edge a semicircular groove 105a, and the roll 106 has on its edge a semi-circular groove 106a. As is more clearly shown in Fig. 16, the rolls 105 and 106 desirably have the grooves 105a and 106a very slightly off-set from each other. This adjustment conveniently may be made by means of the screws 111 and 112.

If round cable is made with more or fewer layers of wires than in the illustrative embodiment herein described, the outer layer of wires desirably is rolled in the manner herein described for the eighteen wire layer.

It is believed that it will be apparent from the foregoing description that I have provided new and useful apparatus for manufacturing in a commercially practicable manner an improved compact cable. It will be understood that the present invention may be variously modified and embodied within the scope of the subjoined claims.

I claim:

1. Apparatus for manufacturing compact cable having a core and a plurality of overlying layers of helically laid wires initially having shapes such that deep valleys exist therebetween, which comprises, in combination, means for moving the core lengthwise, a plurality of stranding units for successively applying overlying layers of helically laid wires about the moving core, and means for compressing and altering the shapes of the wires of each layer, layer by layer to substantially eliminate deep valleys from the layer surface before the next layer is applied, said last mentioned means comprising sets of grooved rolls, each set forming a pass with a continuous periphery.

2. Apparatus for manufacturing compact cable having a core and a plurality of overlying layers of helically laid wires initially having shapes such that deep valleys exist therebetween, which comprises, in combination, means for moving the core lengthwise, a plurality of stranding units for successively applying overlying layers of helically laid wires about the moving core, and compression rolls disposed in the path of movement of the core following each of said stranding units for compacting and altering the shapes of the wires, layer by layer and materially reducing the depths of the valleys on the layer surfaces.

3. Apparatus for manufacturing compact cable having a core and a plurality of overlying layers of helically laid wires, which comprises, in combination, means for moving the core lengthwise, a plurality of stranding units for successively applying overlying layers of helically laid wires about the moving core, compression rolls disposed in the path of movement of the core following each of said stranding units for rolling the layers of wires in different planes radial to the longitudinal axis of the core, and guiding means adjacent each set of rolls for guiding the core into the rolls.

4. Apparatus for compressing a multiple strand cable comprising a plurality of sets of axially aligned reducing rolls disposed one behind the other and adapted to compress the cable in different planes radial to its longitudinal axis and materially reduce the interstrand spaces, said roller sets each comprising a plurality of grooved rolls forming a pass with a continuous periphery, and guiding means adjacent the first set of rolls for guiding the stranded cable directly between the rolls.

5. Apparatus for rolling and forming a multiple strand, sector-shaped cable comprising two parallel grooved reducing rolls for compressing the cable along the major axis of a transverse section, said rolls having meeting flanges on one side of the grooves and spaced flanges on the other side of the grooves, a third roll for simultaneously compressing the cable along the minor axis of the transverse section, said third roll fitting closely between the spaced flanges of said parallel rolls, together all of the rolls forming a pass having a continuous periphery, and means adjacent the rolls having a sector-shaped throat for accurately guiding the cable into the roll pass.

6. Apparatus for rolling the edges of a multiple strand, sector-shaped cable comprising two parallel grooved rolls whose edges meet on one side of the groove and whose edges are spaced apart on the other side of the groove, and a third roll whose edge enters and substantially fills the space between the spaced edges of the first mentioned rolls, the third roll having a groove extending the full width of the part which enters between said other rolls, the grooves of all of said rolls together forming a closed pass having a continuous periphery in cross-section.

7. Apparatus for rolling and forming a multiple strand, sector-shaped cable comprising three rolls having their axes arranged in a plane and their rolling edges constituting a sector shaped pass, the axes of two of said rolls being parallel to each other and perpendicular to the third, the two parallel rolls having deep grooves, meeting flanges on one side of the grooves and spaced flanges on the other side of the grooves, said third roll having a shallow groove extending across its entire operating portion which enters between the spaced flanges of the parallel rolls, the grooves of all of said rolls together forming a sector-shaped pass having a substantially continuous periphery, and means adjacent the rolls having a sector-shaped throat for accurately guiding the cable into the roll pass.

8. Apparatus for manufacturing compact cable having a core and overlying layers of helically laid wires, which comprises, in combination, means for moving the core lengthwise, means for applying overlying layers of wires layer by layer to the moving core, a set of compression rolls for each layer applying means having a pass with a continuous periphery less than that of the layer of wires, and means for each set of rolls for pressing the wires of the layer into place and for guiding the core with its overlying layer of wires between the compression rolls, the rolls for each layer acting to reduce the size of the stranded assembly sufficiently to substantially eliminate deep valleys between strands and impart a smooth outer surface to the assembly.

9. Apparatus for manufacturing compact cable having a core and overlying layers of helically laid wires, which comprises, in combination, means for moving the core lengthwise, means for applying overlying layers of wires layer by layer to the moving core, a set of compression rolls for each layer applying means having a pass with a continuous periphery less than that of the layer of wires, means for each set of rolls for pressing the wires of the layer into place and for guiding the core with its overlying layer of wires between the compression rolls, and micrometer means for adjusting the size of the roll pass, the rolls for each layer acting to reduce the size of the stranded assembly sufficiently to substantially eliminate deep valleys between strands and impart a smooth outer surface to the assembly.

10. Apparatus for forming a multiple strand cable, comprising in combination, means for supplying a plurality of strands to a core to form a layer thereon, the strands having an initial shape such that deep valleys are formed between strands, a throated guide for pressing the strands of the layer into position and guiding the core and layer assembly to reducing rolls, and a plurality of sets of axially aligned reducing rolls disposed in tandem sets adjacent the guide, one set being located to compress the assembly principally on a diameter disposed at an angle to the diameter of principal compression of the adjacent set, the sets of rolls forming enclosed passes which are substantially smaller than the external size of the assembly fed thereto whereby to eliminate deep valleys and impart a smooth outer surface to the assembly.

11. Apparatus as set forth in claim 10 in which the first set of rolls beyond said guide interfit in tongue-and-groove fashion and are provided with cooperating shaping grooves forming a completely enclosed cable-shaping pass interiorly of their interfitting portions.

12. Apparatus as set forth in claim 10 for forming cables having a cross-sectional shape with a major axis and a minor axis in which the first acting set of rolls operates upon the minor axis and the second set operates upon the major axis.

13. Apparatus as set forth in claim 10 for shaping sector-shaped cables in which the first acting set of rolls operates upon the minor axis and performs the greater part of the reduction and the second set of rolls acts upon the major axis to complete the reduction and impart the final shape and smooth surface to the cable assembly.

14. Apparatus as set forth in claim 10 for shaping sector-shaped cables in which the first acting set of rolls comprises two opposed interfitting grooved rolls acting upon the minor axis of the sector and the second set of rolls comprises two opposed deeply grooved rolls acting upon the major axis of the sector, the deeply grooved rolls meeting at their flanges at the apex of the sector and being spaced apart at their other flanges, and a third grooved roll interfitting between the spaced flanges of the opposed deeply grooved rolls to form with the grooves of the opposed rolls a completely enclosed pass for the cable assembly.

15. Apparatus for forming a multiple strand cable, comprising in combination, means for supplying a plurality of strands to a core to form a layer thereon, the strands having an initial shape such that deep valleys are formed between strands, guide means for pressing the strands of the layer into position and guiding the core and layer assembly to reducing rolls, and a plurality of axially aligned rolls disposed in tandem sets adjacent the guide means, the different sets of rolls being so disposed as to work principally each on a different diameter of the cable, the first set of rolls forming an enclosed pass which is substantially smaller in cross-section than the external cross-section of the cable assembly fed thereto whereby to crush the strands and eliminate deep valleys and impart a smooth outer surface to the assembly, the first set of rolls being adjustable to vary the degree of crushing action produced, and the second set of rolls forming an enclosed pass of the desired finished cross-sectional shape and serving principally to shape the cable without materially reducing it.

EDGAR W. McKNIGHT.